US012771393B2

(12) United States Patent
Delshadpour et al.

(10) Patent No.: US 12,771,393 B2
(45) Date of Patent: Oct. 20, 2026

(54) LOW FREQUENCY PERIODIC SIGNALING (LFPS) AND LOSS OF SIGNAL (LOS) DETECTION

(71) Applicant: NXP USA, Inc., Austin, TX (US)

(72) Inventors: Siamak Delshadpour, Phoenix, AZ (US); Abhijeet Chandrakant Kulkarni, Chandler, AZ (US); Sivakumar Reddy Papadasu, Gilbert, AZ (US); Steven Daniel, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 276 days.

(21) Appl. No.: 18/393,503

(22) Filed: Dec. 21, 2023

(65) Prior Publication Data

US 2025/0211273 A1 Jun. 26, 2025

(51) Int. Cl.
*H04B 1/16* (2006.01)
*H02M 1/14* (2006.01)

(52) U.S. Cl.
CPC ............ *H04B 1/1607* (2013.01); *H02M 1/14* (2013.01); *H04B 1/1638* (2013.01)

(58) Field of Classification Search
CPC ...... H04B 1/1607; H04B 1/1638; H02M 1/14
See application file for complete search history.

(56) References Cited

U.S. PATENT DOCUMENTS 4,206,410 A 6/1980 Ito et al.
6,147,681 A 11/2000 Chery et al.
6,177,815 B1 * 1/2001 Baumgartner ......... H03K 5/153 327/76
6,831,521 B1 * 12/2004 Abidin ...................... H03F 3/08 330/136
7,176,726 B2 * 2/2007 Bock ........................ H03G 3/30 330/279
8,391,420 B1 3/2013 An et al.
9,559,905 B2 1/2017 Chen et al.
10,425,161 B2 9/2019 Groepl et al.
10,432,432 B1 10/2019 Liu et al.
10,594,285 B1 * 3/2020 Delshadpour ....... H04L 25/0294
10,763,841 B2 * 9/2020 Huang ................ H03K 17/005
11,323,111 B1 * 5/2022 Lin ....................... H02M 7/217

(Continued)

FOREIGN PATENT DOCUMENTS

JP 09219656 A 8/1997

OTHER PUBLICATIONS

Delshadpour, S. et al. "A 5.4 Gbps Protocol Based CMOS Limiting ReDriver for Type-C Applications", 2019 IEEE 62nd International Midwest Symposium on Circuits and Systems (MWSCAS), Dallas, TX, USA, 2019, pp. 255-258.

(Continued)

*Primary Examiner* — Nathan A Mitchell

(57) ABSTRACT

Embodiments of devices for signal detection, communications devices, and methods for signal detection are disclosed. In an embodiment, a device for signal detection includes a low-pass filter (LPF) coupled to a communications channel and configured to generate a filtered input, a rectifier coupled to the LPF and configured to generate a rectified signal based on the filtered input, and a comparator configured to generate an output based on the rectified signal. Programmable bandwidth and speed provide a wideband signal detector.

19 Claims, 14 Drawing Sheets

(56) References Cited

U.S. PATENT DOCUMENTS

| | | | | |
|---|---|---|---|---|
| 11,481,015 | B2 | 10/2022 | Delshadpour et al. | |
| 11,716,168 | B2 | 8/2023 | Delshadpour et al. | |
| 2014/0105265 | A1 * | 4/2014 | Ho | G11C 17/16 375/224 |
| 2014/0192841 | A1 * | 7/2014 | Zhan | H04L 1/20 375/130 |
| 2014/0269866 | A1 * | 9/2014 | Wang | H03K 3/35625 375/224 |
| 2015/0067209 | A1 | 3/2015 | Liu et al. | |
| 2017/0329386 | A1 * | 11/2017 | Winemiller | G06F 1/324 |
| 2023/0121523 | A1 * | 4/2023 | Delshadpour | H04L 1/0026 714/776 |
| 2024/0304298 | A1 * | 9/2024 | Schabbach | A61M 5/31551 |

OTHER PUBLICATIONS

Delshadpour, S. et al. "A 5.4 Gbps Type-C USB3.1/DP1.2 Combo Limiting ReDriver in 0.14 µm CMOS Technology," 2019 IEEE Canadian Conference of Electrical and Computer Engineering (CCECE), Edmonton, AB, Canada, 2019, pp. 1-4.

* cited by examiner

LOW FREQUENCY PERIODIC SIGNALING (LFPS) AND LOSS OF SIGNAL (LOS) DETECTION

BACKGROUND

Detection of data communications through a communications channel can be used to adjust communications performance, for example, to reduce power consumption of a communications device and/or to control data traffic through the communications channel. For example, Loss of Signal (LOS) detection is a standard feature of many communication integrated circuits (ICs) and can be especially important for high-speed serial transceivers (in the receiver section). Without an LOS detector, receivers, generally known to consume high power (since they need to stay on), can spend time and consume power processing invalid data or noise, which can increase the bit error rate (BER) in a communications system. In addition, Low Frequency Periodic Signaling (LFPS) detection can be used to detect low frequency communications through a communications channel. LOS detection typically has a higher detection accuracy than LFPS detection. However, LOS detection typically consumes more power than LFPS detection and may not be viable when a communications device operates in a low-power operational state/mode. Therefore, there is a need for a LOS and LFPS detection technology that can work when a communications device operates in low and high frequencies and that can dynamically scale between low and high-power consumption with a low complexity of architecture and analog design and low circuit area requirement.

SUMMARY

Embodiments of devices for signal detection, communications devices, and methods of signal detection are disclosed. In an embodiment, a device for signal detection includes a low-pass filter (LPF) coupled to a communications channel and configured to generate a filtered input, a rectifier coupled to the LPF and configured to generate a rectified signal based on the filtered input, and a comparator configured to generate an output based on the rectified signal. Other embodiments are also described.

In an embodiment, the comparator is further configured to compare the rectified signal with a reference voltage to generate the output.

In an embodiment, the comparator and the rectifier are configured to be enabled by an enablement signal for LFPS detection.

In an embodiment, LOS detection detects a first frequency range of data communications through the communications channel, LFPS detection detects a second frequency range of the data communications through the communications channel, and the second frequency range is included in the first frequency range.

In an embodiment, LOS detection consumes higher current, and wherein LFPS detection consumes lower current.

In an embodiment, the LPF includes a resistor coupled to the communications channel, a programmable capacitor coupled to the resistor, a switch connected between the programmable capacitor and a fixed voltage, and a second capacitor coupled to the programmable capacitor and to the resistor.

In an embodiment, the second capacitor is coupled to the programmable capacitor, to the resistor, and to the fixed voltage.

In an embodiment, the fixed voltage is zero volt.

In an embodiment, LFPS detection and LOS detection are enabled when the device for signal detection operates in a high-power operational state.

In an embodiment, a communications device includes a device for signal detection coupled to a communications channel, and a digital logic circuit configured to process an output of the device for signal detection to generate a processed output and to output the processed output for controlling data communications through the communications channel.

In an embodiment, the device for signal detection includes a LPF coupled to the communications channel and configured to generate a filtered input, a rectifier coupled to the LPF and configured to generate a rectified signal based on the filtered input, and a comparator configured to generate the output based on the rectified signal.

In an embodiment, the comparator is further configured to compare the rectified signal with a reference voltage to generate the output.

In an embodiment, the comparator and the rectifier are configured to be enabled by an enablement signal for LFPS detection.

In an embodiment, LOS detection detects a first frequency range of data communications through the communications channel, LFPS detection detects a second frequency range of the data communications through the communications channel, and the second frequency range is included in the first frequency range.

In an embodiment, the LPF includes a resistor coupled to the communications channel, a programmable capacitor coupled to the resistor, a switch connected between the programmable capacitor and a fixed voltage, and a second capacitor coupled to the programmable capacitor and to the resistor.

In an embodiment, the second capacitor is coupled to the programmable capacitor, to the resistor, and to the fixed voltage.

In an embodiment, the fixed voltage is zero volt.

In an embodiment, LFPS detection and LOS detection of the device for signal detection are enabled when the communications device operates in a high-power operational state.

In an embodiment, the digital logic circuit is configured to perform logic operations using the output of the device for signal detection.

In an embodiment, a method for signal detection involves generating a filtered input using a LPF coupled to a communications channel, generating a rectified signal based on the filtered input using a rectifier coupled to the LPF, and generating an output based on the rectified signal using a comparator coupled to the rectifier.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
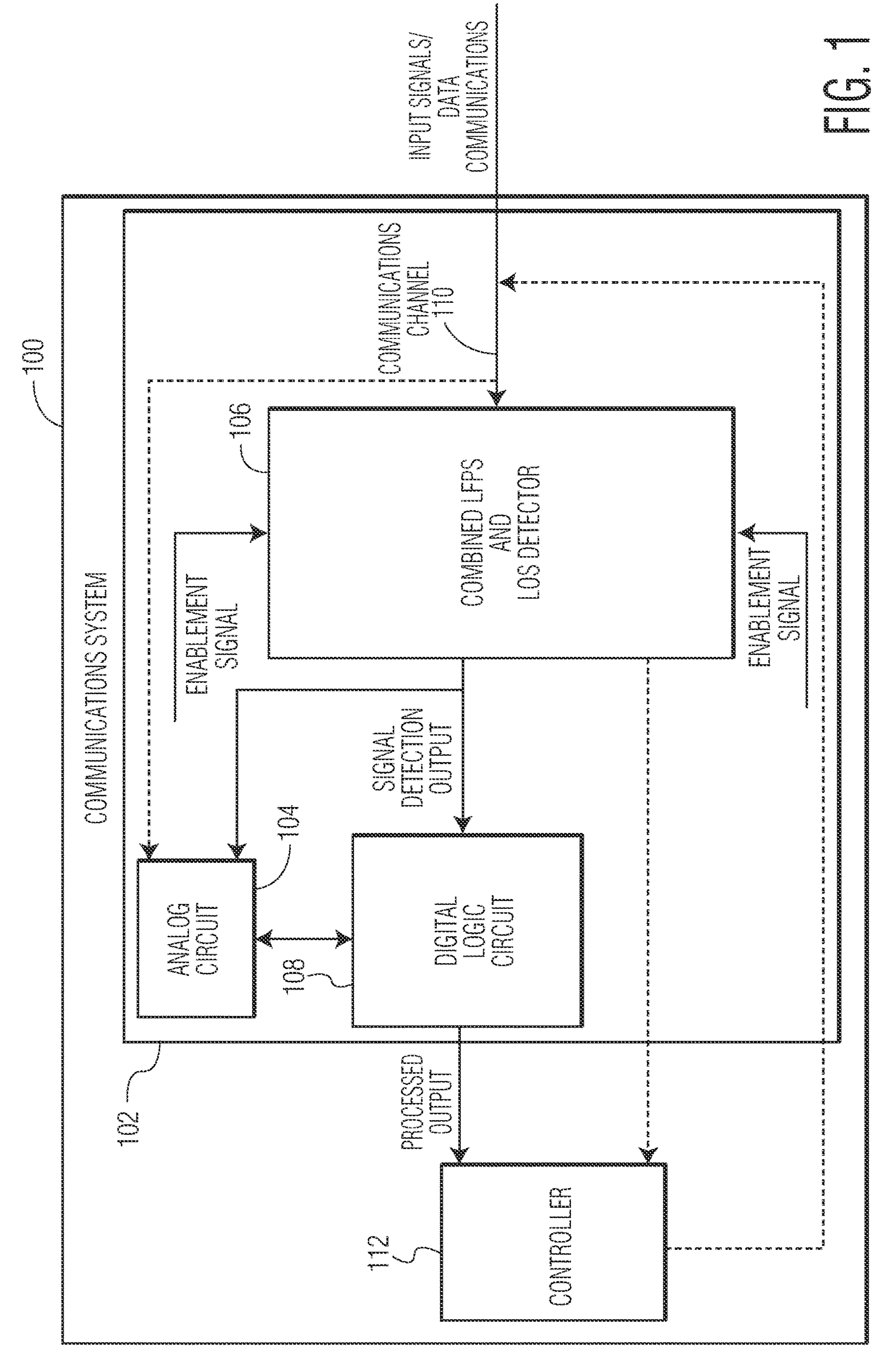
FIG. 1 is a schematic block diagram of a communications system in accordance with an embodiment of the invention.

FIG. 1 is a schematic block diagram of a communication system 100 in accordance with an embodiment of the invention. In the embodiment depicted in FIG. 1, the communication system 100 includes a communications device 102, which includes a combined LFPS and LOS detector 106 and a digital logic circuit 108, and is coupled to a communications channel 110, and a controller 112. In some embodiments, a first element is coupled to or connected to a second element in a direct connection between the first element and the second element and/or an indirect connection between the first element and the second element. In some embodiments, a first element is coupled to or connected to a second element through a direct or indirect connection, either physical or electrical, between the first element and the second element. The communication system 100 can be used in various applications, such as automotive applications, communications applications, industrial applications, medical applications, computer applications, and/or consumer or appliance applications. For example, the communication system 100 can be used in Universal Serial Bus (USB), Thunderbolt (TBT), converged input/output (CIO), and/or DisplayPort (DP) applications. In some embodiments, the communications system 100 is implemented in a substrate and is packaged as a stand-alone semiconductor integrated circuit (IC) device or chip. In these embodiments, the controller is internal to the communications system 100. In some embodiments, the communications device 102 is implemented in a substrate and is packaged as a stand-alone semiconductor IC device or chip. In these embodiments, the controller is external to the communications device 102. In some embodiments, the communications device 102 is included in a computing device, such as a smartphone, a tablet computer, a laptop, etc. In some embodiments, at least some of the components of the communications device 102 are implemented in a substrate, such as a semiconductor wafer or a printed circuit board (PCB). In an embodiment, at least some of the components of the communications device 102 are packaged as a stand-alone semiconductor IC chip. Although the communications system 100 is shown in FIG. 1 as including certain circuit elements, in other embodiments, the communications system 100 may include one or more additional circuit elements. In some embodiments, the communication system 100 includes an additional circuit, such as, an analog circuit 104. This additional circuit can be one or more digital circuits or analog circuits as shown in 104. The analog circuit 104 can be implemented using various analog components. Signal detection output can go directly to 0 the analog circuit 104 to control the analog circuit 104 directly "or" through the digital logic/state machine 108. In some embodiments, input signals through the communications channel 110 are directly inputted into the analog circuit 104.

In the embodiment depicted in FIG. 1, the combined LFPS and LOS detector 106 is coupled to the communications channel 110 and is configured to perform LOS and LFPS detection. The combined LFPS and LOS detector 106 may be implemented as hardware, software, firmware, and/or a combination of hardware, software, and/or firmware. In some embodiments, the combined LFPS and LOS detector 106 is implemented as a processor such as a microcontroller or a central processing unit (CPU).

In some embodiments, the combined LFPS and LOS detector 106 is configured to perform LOS detection by detecting an input signal level (e.g., current, voltage, and/or signal amplitude) of data communications through the communications channel 110. For example, when the input signal level (e.g., current, voltage, and/or signal amplitude) is lower than a threshold level (e.g. 80 millvolt (mv)), which is predetermined depending on a specific application in which the communications device 102 is used and the channel loss of the communications channel 110, the combined LFPS and LOS detector 106 triggers a loss of signal event, which causes the communication system 100 (e.g., the controller 112) to immediately disable the communications system 102 after a time-out interval to reduce power consumption. The LOS detection function of the combined LFPS and LOS detector 106 may be enabled by, for example, an enablement signal. Depending on one or more supported standards (e.g., USB, TBT, and/or DP), incoming signals may be in a wide frequency range such that the combined LFPS and LOS detector 106 needs to support a wide frequency bandwidth. In addition, LOS detector reaction time of the combined LFPS and LOS detector 106 needs to be fast to have a fast "active to idle" and "idle to active" time for a high-speed communications channel.

In some embodiments, the combined LFPS and LOS detector 106 is configured to perform LFPS detection by detecting a specific low frequency signaling. For example, LFPS In USB 3.x and USB4 standards is used for in-band communication (e.g., time-multiplexed on the same high-speed data pins) between two ports across a communications link (e.g., the communications channel 110) that is in a low power/configuration (e.g., polling) state. In some embodiments, LFPS Signaling is used when a communications link (e.g., the communications channel 110) is under training (e.g., under a USB 3.x standard), low power (under a USB 3.x standard and a USB4 standard) or when a downstream port issues Warm Reset to reset the link (e.g., under a USB 3.x standard). LFPS signal may be a sideband of communication that is sent on normal superspeed data lines at a lower frequency (e.g., 10-50 Mega Hertz (MHz) instead of 5/10/20 Gbps (gigabits per second)), which helps to manage signal initiation and low power management on the bus on a link between two ports (e.g., under a USB 3.2 standard). The LFPS detection function of the combined LFPS and LOS detector 106 may be enabled by, for example, an enablement signal.

LOS detection typically has a higher detection accuracy than LFPS detection. LOS detection typically consumes more power than LFPS detection and may not be viable when a communications device operates in a low-power operational state. In some embodiments, both LOS detection and LFPS detection of the combined LFPS and LOS detector 106 are enabled when the communications device 102 operates in a high-power operational state (e.g., USB U0 state that is the normal operational state where SuperSpeed signaling is enabled and 5 Gigabyte (Gb) packets are transmitted and received). In the high-power operational state, the output of the LOS detection and the output of the LFPS detection are combined, for example, using a simple combinational logic with simple addition logic to generate a combined output, which is used to control data communications through the communications channel 110. Because the communications device 102 operates in a high-power operational state, the communications device 102 has a higher power consumption budget and can afford to use both LOS detection and LFPS detection. In low-power operational states (e.g., USB U1, U2, U3 states that are low-power states where no 5 Gb packets are transmitted and have increasingly longer wakeup times to re-enter U0 operation state, and thus allow transmitters to go into increasingly deeper sleeps), LOS detection and LFPS detection of the combined LFPS and LOS detector 106 can operate independently from each other (e.g., only one of LOS detection and LFPS detection of the combined LFPS and LOS detector 106 is enabled). For example, LOS detection of the combined LFPS and LOS detector 106 can allow an IC chip to work in low current mode without impacting any other regular operational mode. Consequently, the communications device 102 and/or the communication system 100 can be used in a protocol based redriver or repeater with more low-frequency and high-frequency signal detectors. Although LOS detection consumes higher current than LFPS detection, the power consumption of the communications device can be kept low because both LOS detection and LFPS detection of the combined LFPS and LOS detector 106 are enabled only for a high-power operational mode (e.g., USB U0 state). As a result, the effective bandwidth of the combined LFPS and LOS detector 106 can be increased to cover the full frequency range of the communications channel 110. Consequently, the combined LFPS and LOS detector 106 can perform signal detection accurately in different operational states/modes.

In the embodiment depicted in FIG. 1, the digital logic circuit 108 is configured to process a signal detection output of the combined LFPS and LOS detector 106 to generate a processed output for the controller 112, which can, for example, control data communications through the communications channel 110. In some embodiments, the digital logic circuit 108 combines an output of LOS detection (i.e., LOS output) and an output of the LFPS detection (i.e., LFPS output) to generate a combined output and to output the combined output to control data communications through the communications channel 110. In some embodiments, the digital logic circuit is configured to perform logic operations using the output of LOS detection/LFPS detection and a bypass signal to generate the combined output. The digital logic circuit may be implemented with one or more logic gates. In some embodiments, the digital logic circuit includes an NOR gate, a NAND gate, and an AND gate. In some embodiments, the digital logic circuit is configured to perform a logical NOR operation, a logical NAND operation, and a logical AND operation using an NOR gate, a NAND gate, and/or an AND gate based on the output of LOS detection, the output of LFPS detection, and a bypass signal to generate the combined output.

In some embodiments, the communication system 100 (e.g., the digital logic circuit 108 and/or the controller 112) is configured to, based on an output of the combined LFPS and LOS detector 106, enable or disable the data communications through the communications channel 110. The controller 112 may be implemented as hardware, software, firmware, and/or a combination of hardware, software, and/or firmware. In some embodiments, the controller 112 is implemented as a processor such as a microcontroller or a CPU. In some embodiments, the communication system 100 (e.g., the digital logic circuit 108 and/or the controller 112) is configured to, based on an output of the combined LFPS and LOS detector 106, reset the communications channel. In some embodiments, the communication system 100 (e.g., the controller 112) is configured to control the data communications through the communications channel based on LOS detection output of the combined LFPS and LOS detector 106. In some embodiments, the communication system 100 (e.g., the digital logic circuit 108 and/or the controller 112) is configured to, based on LOS detection output of the combined LFPS and LOS detector 106, enable or disable the data communications through the communications channel. The communication system 100 (e.g., the digital logic circuit 108 and/or the controller 112) can lower its power consumption, by disabling the high-current consuming LOS detection of the combined LFPS and LOS detector 106, and only enabling the low-current consuming LFPS detection of the combined LFPS and LOS detector 106.

In some embodiments, the communications device 102 and/or the communication system 100 is implemented as a redriver or a repeater. A redriver can be used to provide signal equalization, amplification and/or waveform shaping such that a transmitted signal behaves as intended over long channels. For example, a redriver can be used to compensate for the insertion loss. In some embodiments, in addition to a redriver includes at least one of a receiver termination unit, an input buffer, a Continuous Time Linear Equalizer (CTLE) configured to perform signal equalization on an input signal, an output buffer configured to generate a driver signal in response to the signal equalization, a transmitter driver, and a transmitter termination unit.

Figure 2:
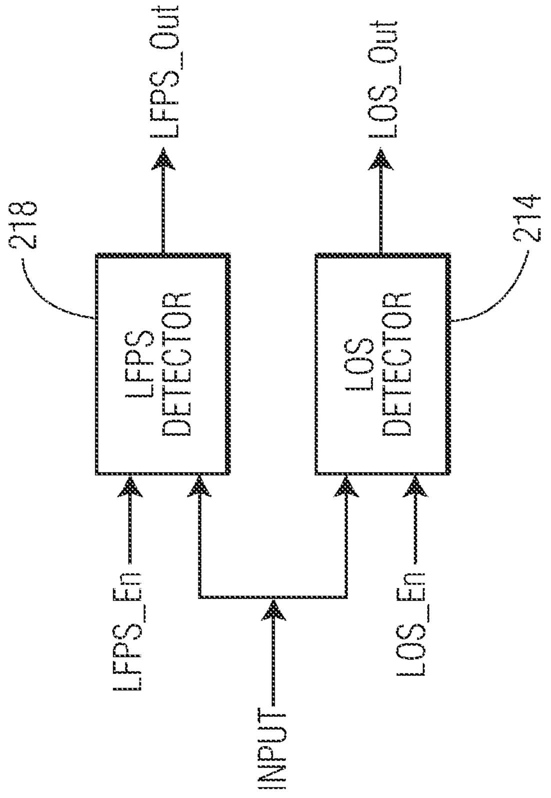
FIG. 2 depicts an LOS detector and an LFPS detector that are separate from each other.
Figure 3:
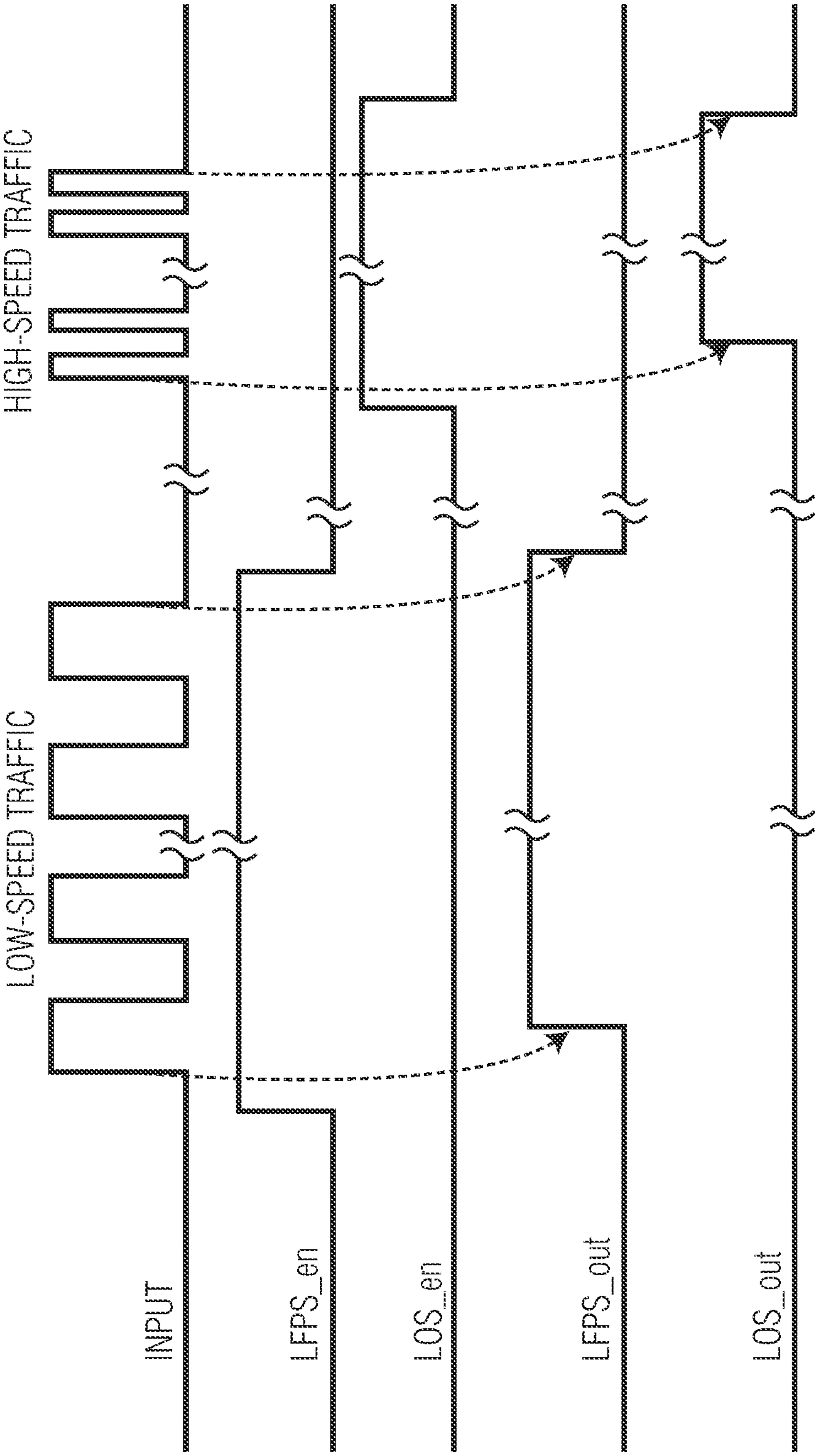
FIG. 3 depicts some examples of waveforms of the input signal of the LOS detector and the LFPS detector depicted in FIG. 2, enablement signals of the LOS detector and the LFPS detector depicted in FIG. 2, and output signals of the LOS detector and the LFPS detector depicted in FIG. 2.

Due to wide frequency range for LFPS and high-speed signals, in a traditional high-speed signal conditioner, two circuits are being considered to handle these two types of signal detection. For example, a low current circuit as LFPS (for low-frequency signaling) detector and a high current circuit as LOS (for high-frequency signaling) detector are used to handle these two types of signal detection. FIG. 2 depicts an LOS detector 214 and an LFPS detector 218 that are separate from each other. An input signal is inputted into the LOS detector 214 and the LFPS detector 218, which can be enabled by an enablement signal LOS_En or LFPS_En, respectively to generate an output signal, LOS_Out or LFPS_Out, respectively. While waiting for low-speed signal, the LFPS detector 218 is used and for high-speed signal detection, the LOS detector 214 is used. FIG. 3 depicts some examples of waveforms of the input signal of the LOS detector 214 and the LFPS detector 218 depicted in FIG. 2, LOS_En, LFPS_En enablement signals of the LOS detector 214 and the LFPS detector 218 depicted in FIG. 2, and output signals LOS_Out, LFPS_Out of the LOS detector and the LFPS detector depicted in FIG. 2. Due to the timing and difference in frequencies of low-frequency (LF) and high-frequency (HF) signals (e.g., LF frequency 20-50 MHz versus HF frequency 0.27-10 GHz or more, depending on the supported standards) and tough timing requirements, the LFPS detector and the LOS detector independently operate for low-frequency and high-frequency signal detection, respectively. Although the input signal is shown in a single ended form, in real applications, the input signal may be a differential signal. In the example waveforms depicted in FIG. 3, the enablement signal, LFPS_en, is positive for low-speed traffic, and the LFPS detector detects the low-speed traffic and the output, LFPS_out, of the LFPS detector is positive during low-speed traffic, while the enablement signal, LOS_en, is positive for high-speed traffic, and the LOS detector detects the high-speed traffic and the output, LOS_out, of the LOS detector is positive during high-speed traffic. When the LFPS detector detects the signal, the communications system 100 wait for high-speed traffic and the LOS detector is turned ON to detect the high-frequency signal and its LOSS. In a real application, depending on the expected mode, during waiting for either LF or HF signals, enable signals can stay "ON" till signal is detected or can be applied periodically.

Communications protocols, such as, USB protocols, allow designing for various system level scenarios, where based on the protocol knowledge, a redriver can decide whether it expects High-Speed signal, or LFPS signal, or either of them. Compared to an architecture having two separate signal detectors, having a single programmable signal detector, such as, the combined LFPS and LOS detector 106 depicted in FIG. 1, for low and high frequencies, which can dynamically scale between low and high-power consumption, is a good solution with lower complexity of architecture and analog design, while providing low power mode and takes overall smaller area for the needed signal detector. For some operational modes, such as, USB-U0, it is a challenge to design two detectors to have precise minimum/maximum cutoffs on the signal frequencies that they must or must-not detect. A single programmable signal detector, such as, the combined LFPS and LOS detector 106 depicted in FIG. 1, can cover all the possible scenarios of signal detection for an industrial grade chip, without leaving gaps or overlaps of detectable frequencies by different signal detectors, which could have led to erroneous decision making by a digital state machine.

In some embodiments, the combined LFPS and LOS detector 106 combines LFPS and LOS detection of high-speed link in a protocol-based system, which is good for USB, DP, . . . applications (e.g., USB-U0 mode). The combined LFPS and LOS detector 106 can be used for any type of signal conditioner that supports protocol based multi standard chips. The combined LFPS and LOS detector 106 can be integrated in a low-frequency and high-frequency squelch detector. In some embodiments, the combined LFPS and LOS detector 106 provides a programmable power/bandwidth signal detector, which is applicable for different architectures of a protocol-based signal conditioner/repeater/redriver. In some embodiments, the combined LFPS and LOS detector 106 is a combined LOS and LFPS detector with the needed frequency selection in normal mode. In some embodiments, the combined LFPS and LOS detector 106 is used in USB-Polling, USB-U0 and low power modes, which makes a chip able to work in low current mode by using low speed feature as an LFPS detector. In some embodiments, the combined LFPS and LOS detector 106 is a programmable, frequency/current signal detector for the desired speeds, which can be used in protocol based Redrivers/Repeaters with more low-frequency and high-frequency signal detectors. The combined LFPS and LOS detector 106 can increase the effective bandwidth of an LFPS detector to cover full frequency range. In some embodiments, the combined LFPS and LOS detector 106 is programmable for different protocols, which means lower power consumption for lower speed protocols (e.g., 5 GHz or 10 GHz or other frequency range), which avoids leaving gaps or overlaps of detectable frequencies by different signal detectors, which can have led to an erroneous decision making by a digital state machine.

Figure 4:
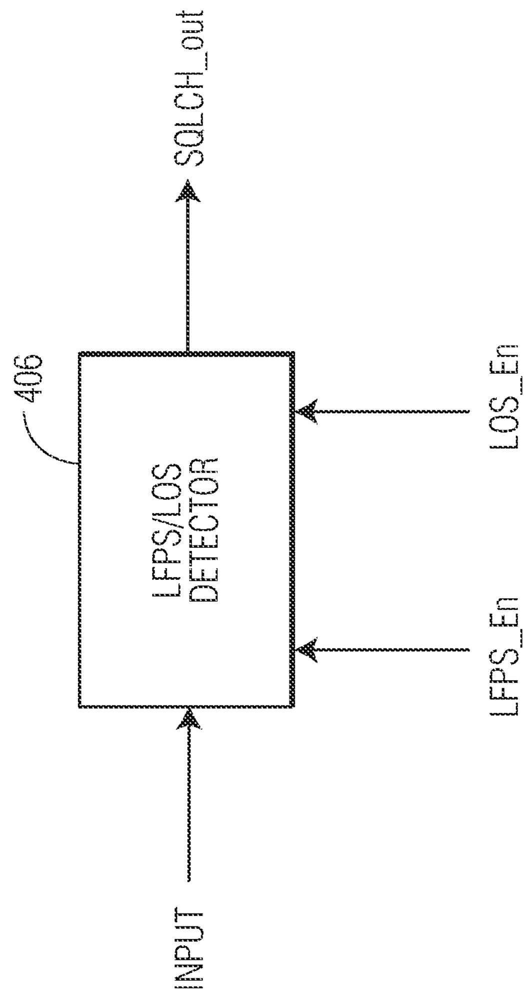
FIG. 4 depicts an LFPS/LOS detector in accordance with an embodiment of the invention.

FIG. 4 depicts an LFPS/LOS detector 406 in accordance with an embodiment of the invention. The LFPS/LOS detector 406 depicted in FIG. 4 is an embodiment of the combined LFPS and LOS detector 106 depicted in FIG. 1. However, the combined LFPS and LOS detector 106 depicted in FIG. 1 is not limited to the LFPS/LOS detector 406 depicted in FIG. 4. In the embodiment depicted in FIG. 4, an input signal is inputted into the LFPS/LOS detector 406. LOS detection or LFPS detection of the LFPS/LOS detector 406 can be enabled by an enablement signal LOS_En or LFPS_En, respectively to generate an output signal SQLCH_out. While waiting for low-speed signal, LFPS detection of the LFPS/LOS detector 406 is used and for high-speed signal detection, LOS detection of the LFPS/LOS detector 406 is used.

Figure 5:
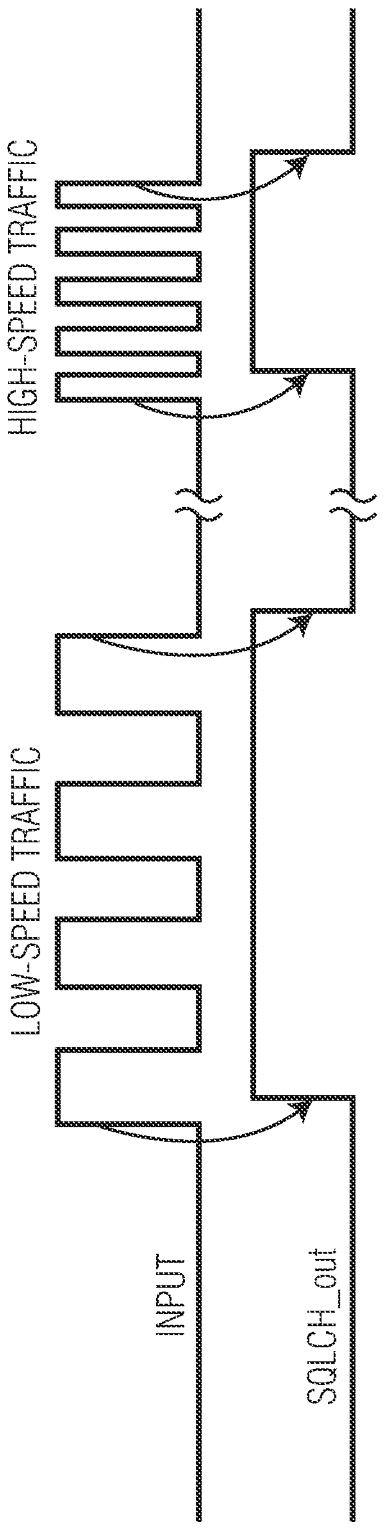
FIG. 5 depicts some examples of waveforms of the input signal to the LFPS/LOS detector depicted in FIG. 4 and the output signal of the LFPS/LOS detector depicted in FIG. 4.

FIG. 5 depicts some examples of waveforms of the input signal to the LFPS/LOS detector 406 depicted in FIG. 4 and the output signal SQLCH_out of the LFPS/LOS detector 406 depicted in FIG. 4. In the example waveforms depicted in FIG. 5, both LOS detection and LFPS detection of the LFPS/LOS detector 406 are enabled for high-speed traffic, and the combined output is outputted during high-speed traffic while for low-speed traffic, LFPS detection is enabled and the output of LFPS detection is the output signal SQLCH_out.

The LFPS/LOS detector 406 can differentiate between LF and HS signals and treat the detected signals independently, which means detection of LFPS and LOS for a wide range of frequency, for example, 20 MHz to 10 GHz or more. Both low-frequency and high-frequency signals are treated equally in the LFPS/LOS detector 406, which is a wide-band signal detector. However, high current consumption for low-frequency signals is not a good design for low-power modes or chip. In some embodiments, the LFPS/LOS detector 406 has a programmable bandwidth (BW) and current consumption that can address high current consumption for low-frequency signals and avoid any potential issue of wrong detection of PRBS (pseudorandom binary sequence) signals (e.g., PRBS7, PRBS15, . . . . PRBSN which N can be a large number depending on the communication standard). For example, a USB state machine, which controls enable signals and based on the incoming signal (LFPS or HS) and based on the detected signal (LFPS_out or LOS_out), enables a high speed "signal conditioner" (e.g., a linear or limiting Redriver, Retimer), has control on timing of LFPS_en and LOS_en signals. Having one signal_detector_out can be adequate if the control state machine knows it expects sign of low-frequency or high-frequency signals, which can happen by a low_freq_en or high_freq_en as a map to LFPS_en or LOS_en signals. Digital design and LTSSM state-machines may have an expectation that an LFPS detector is a low-power low-accuracy design that covers the full frequency band up to 5 GHz, and an LoS detector is the high accuracy circuit that detects frequency band up to 5 GHz. The high accuracy of an LoS detector is needed only in U0 states, where a Redriver can afford to consume more power, and enables both the LoS and LFPS detectors, which means the high-current mode will be selected. If a Redriver had single wide-band squelch detector circuit to detect "any" activity versus channel idleness, low speed or high-speed, it can handle the situation alone. However, the wide band squelch circuit consumes high current, which destroys the "low power" modes of chip, such as USB's U1, U2, U3. (Design details regarding how a digital state machine can function correctly when an LFPS detector covers the complete high-speed bandwidth: because all LFPS/LBPM (LFPS Based PWM Message) messages are always shorter than 3 μs, when a digital state machine sees that LFPS/LBPM is detected, but at the same time the highspeed (HS) data is detected for longer than 3 μs, then it ignores the LFPS/LBPM detection.) In real life, PRBS may be selected to cover high-frequency signals. Nature of PRBSN is based on maximum length of PRBSN-frequency/N which is practically N times less than the official frequency. During the states (e.g., U0, U0-Training, Wait-for-Warm-Reset-to-End, Switch_HS_ON/OFF_steps, Polling LFPS) when a digital state machine enables an LOS detector and an LFPS detector at the same time, the below described digital design can allow the state machine to see the LFPS detector to have a full frequency bandwidth supported, which means that for a combined LFPS and LOS detector, the low power mode can be selected, which makes the signal detector work as LFPS detector. For the LoS detector case, the high-power mode can be selected, which makes a combined LFPS and LOS detector act as an LOS detector. Also, in a multi-protocol based redriver supporting different USB and DP standards, high-speed signal has different ranges (e.g., 0.27 GHz to 10+ GHz). The BW/current control signal can provide the feature to consume less current for lower-speed signals, means and overall, more current efficient chip.

Low Frequency Periodic Signaling (LFPS) In USB 3.x and USB4 is used for in-band communication (time-multiplexed on the same high-speed data pins) between the two ports across a link that is in a low power/configuration (polling) state. LFPS Signaling is used when a link is under training (USB 3.x), low power (USB 3.x & USB4) or when a downstream port issues "Warm Reset" to reset the link (USB 3.x). LFPS signal is a sideband of communication sent on the normal SuperSpeed data lines at a lower frequency (10-50 MHz instead of 5/10/20 Gbps). This signaling helps to manage signal initiation and low power management on the bus on a link between two ports (USB 3.2 Revision 1.0 sec. 7.5.4.6).

Link Training and Status State Machine (LTSSM-USB 3.x) is a state machine that defines link connectivity and link power management. LTSSM consists of 12 states, which includes four operational link states (U0, U1, U2, U3), 4 link initialization and training states (RX Detect, Polling, Recovery, Hot Reset), two link test states (Loopback and Compliance Mode), Inactive (which is a link error state where USB 3.0 is non-operable), Disabled (where the SuperSpeed bus is disabled and operates as USB 2.0 only). For a USB 3.x device to enter the U0 operational link state, the link must be trained in order to synchronize the transmitter and receiver between the host and device. Key LTSSM link states are as follows: RX Detect (far-end termination detection). This is the initial power-on state where a transmitter checks for proper receiver termination to determine if its SuperSpeed partner is present on the bus. When the termination is detected, link training can begin.

Figure 6:
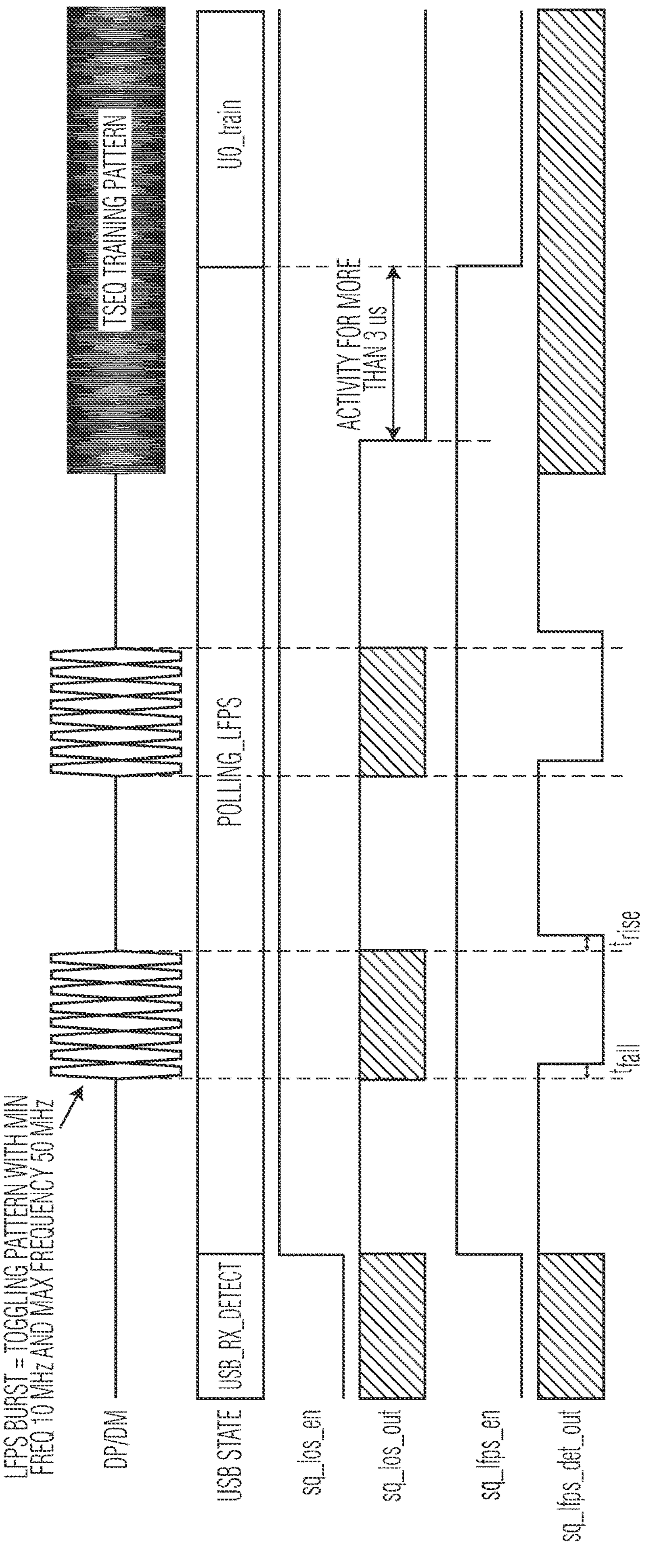
FIG. 6 shows some examples of waveforms of pooling LFPS state according to a Universal Serial Bus (USB) standard.

During a polling state, two link partners train the link to synchronize their communications in preparation for data transmission. FIG. 6 shows some examples of waveforms of the pooling LFPS state according to, for example, a USB standard, which may need both an LFPS detector and an LOS detector to operate. Specifically, waveforms of negative data denoted as D-(DM), positive data denoted as D+ (DP), a training signal of equalization (TSEQ) training pattern, an LOS enablement signal, sq_los_en, an LFPS enablement signal, sq_lfps_en, an LOS output, sq_los_out, and an LFPS detection output, sq_lfps_det_out, are presented.

Figure 7:
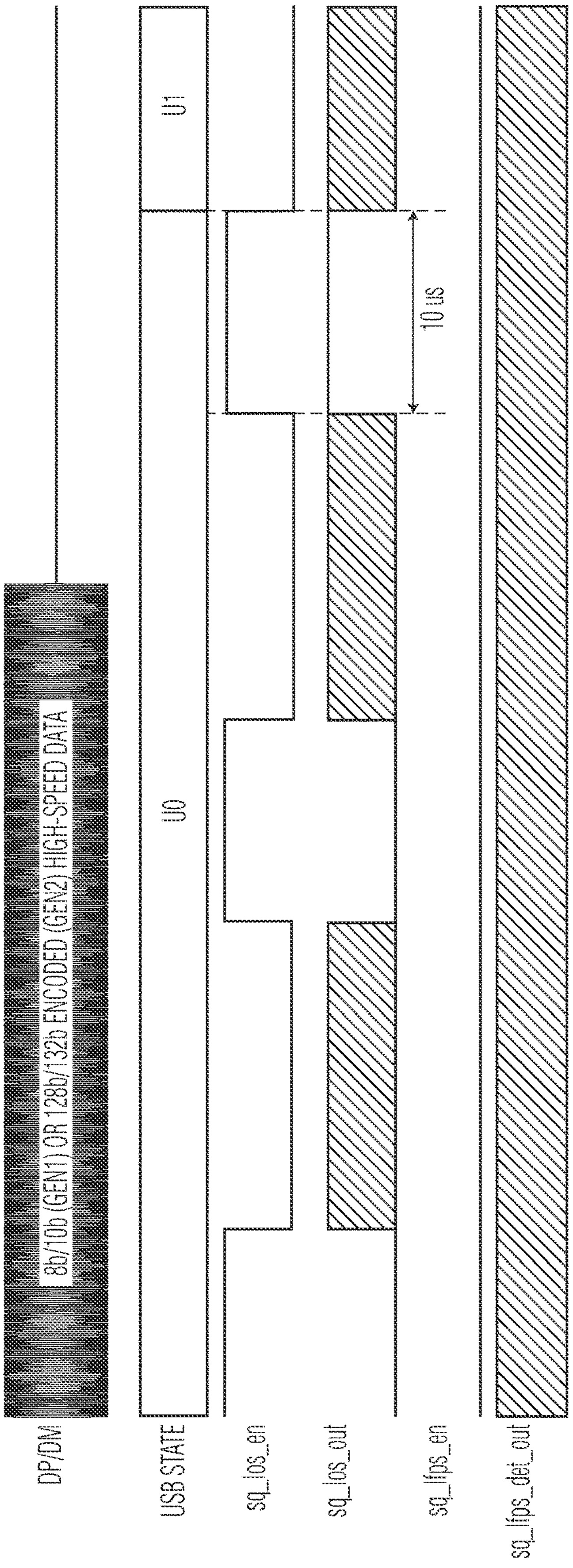
FIG. 7 shows some examples of waveforms of U0 state according to a USB standard.

The U0 operation state is the normal operational state (i.e., high-power state) where SuperSpeed signaling is enabled and 5 Gb packets are transmitted and received. FIG. 7 shows some examples of waveforms of the U0 state according to a USB standard, which may need an LOS detector to operate. Specifically, waveforms of negative data denoted as D-(DM), positive data denoted as D+ (DP), an LOS enablement signal, sq_los_en, an LFPS enablement signal, sq_lfps_en, an LOS output, sq_los_out, and an LFPS detection output, sq_lfps_det_out, are presented.

Figure 8:
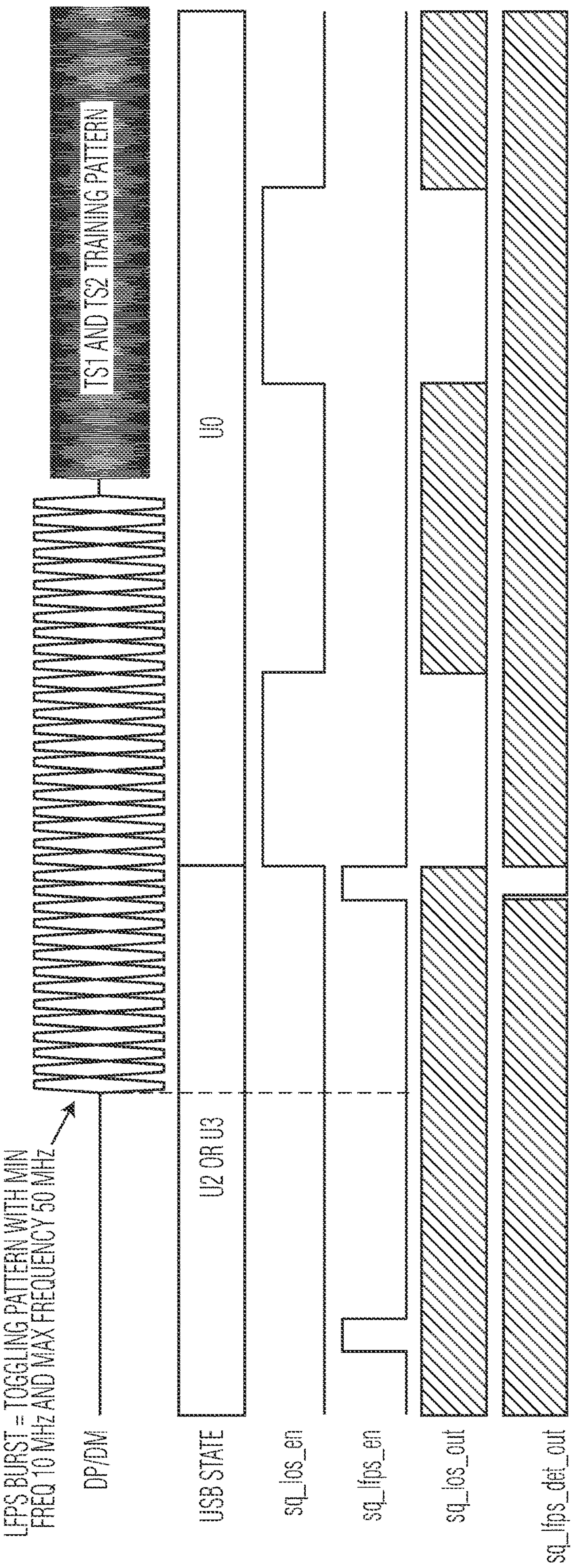
FIG. 8 shows some examples of waveforms of U1, U2, and U3 operational states according to a USB standard.

U1, U2, U3 operational states are low-power states where no 5 Gb packets are transmitted. U1, U2, and U3 operational states have increasingly longer wakeup times to re-enter U0, and thus allow transmitters to go into increasingly deeper sleeps. FIG. 8 shows some examples of waveforms of U1, U2, and U3 operational states according to a USB standard, which may need both an LFPS detector and an LOS detector to operate. Specifically, waveforms of negative data denoted as D-(DM), positive data denoted as D+ (DP), TS1, TS2 training patterns, an LOS enablement signal, sq_los_en, an LFPS enablement signal, sq_lfps_en, an LOS output, sq_los_out, and an LFPS detection output, sq_lfps_det_out, are presented.

Figure 9:
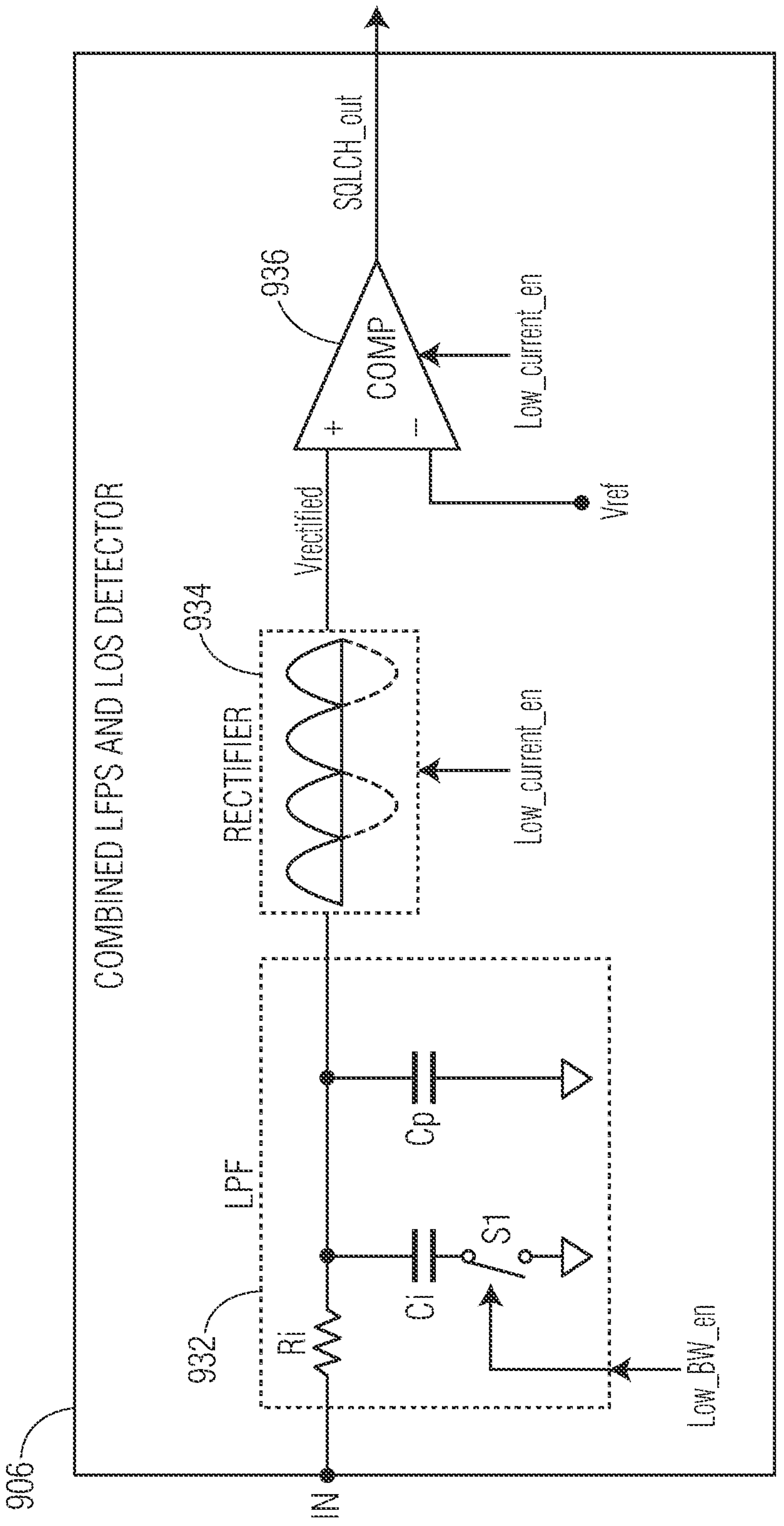
FIG. 9 depicts a combined LFPS and LOS detector in accordance with an embodiment of the invention.

FIG. 9 depicts a combined LFPS and LOS detector 906 in accordance with an embodiment of the invention. The combined LFPS and LOS detector 906 depicted in FIG. 9 is an embodiment of the LFPS/LOS detector 406 depicted in FIG. 4. However, the LFPS/LOS detector 406 depicted in FIG. 4 is not limited to the combined LFPS and LOS detector 906 depicted in FIG. 9. In the embodiment depicted in FIG. 9, an input signal IN is inputted into the combined LFPS and LOS detector, which can be switched between a "low-current/low-BW" LFPS detection mode and a "high-current/high-BW" LOS detection mode. In the embodiment depicted in FIG. 9, the combined LFPS and LOS detector includes a low-pass filter (LPF) 932, a rectifier 934, and a comparator 936 (in general, low current provide slower circuits, so low current and low BW work together). LOS detection or LFPS detection of the combined LFPS and LOS detector 906 can be enabled or disabled to generate an output signal SQLCH_out. In the embodiment depicted in FIG. 9, the LPF 932 includes a resistor Ri that provides isolation from a high-speed line (also secondary Electrostatic Discharge (ESD) protection (in combination with Cp or Ci or input capacitance of rectifier 934) for the input stage of the combined LFPS and LOS detector 906), a capacitor Cp, a programmable capacitor Ci, and a switch S1. The capacitor Cp is the capacitor at the input of the rectifier 934 which indicates (the possible added capacitor to that node plus) the parasitic capacitor of that node and shapes an RC filter with combination of the series Ri resistor, which its BW must be higher than BW of the maximum incoming HS signal. Adding the capacitor Ci can lower the BW to LFPS signaling BW, R & "Ci+Cp" can shape the BW in the LFPS mode. LFPS detection of the combined LFPS and LOS detector 906 can be enabled by an enablement signal Low_current_en.

$$\text{LFPS\_en} = \text{Low\_current\_en} = S1 \rightarrow \text{Closed}$$

$$\text{LOS\_en} = S1 \rightarrow \text{Open}$$

This means that in LFPS mode, a lower BW LPF can be considered for the input stage, also both the rectifier 934 and the comparator 936 work in low current (equally slow or low BW) mode. More than one control signal can be used, which means different bandwidths to have more BW/current modes if needed. That can be done by a set of programmable capacitors, such as, Ci. In the embodiment depicted in FIG. 9, the rectifier 934 generates a voltage Vrectified and the comparator 936 compares the voltage Vrectified with a reference voltage Vref to generate the output signal SQLCH_out. The rectifier 934 and the comparator 936 can be enabled or disabled by the enablement signal Low_current_en.

Figure 10:
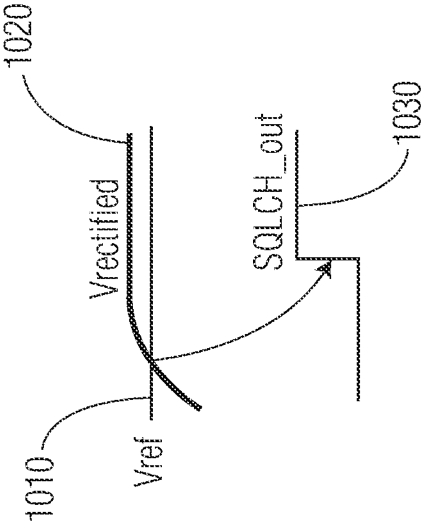
FIG. 10 depicts some examples of signal waveforms of the combined LFPS and LOS detector depicted in FIG. 9.

FIG. 10 depicts some examples of signal waveforms of the combined LFPS and LOS detector 906 depicted in FIG. 9. Specifically, the reference voltage Vref of the comparator 936, the voltage Vrectified that is generated by the rectifier 934, and the output signal SQLCH_out of the combined LFPS and LOS detector 906 are presented. When the voltage Vrectified is higher than the reference voltage Vref, the output signal SQLCH_out starts to change from logic 0 to logic 1.

Figure 11:
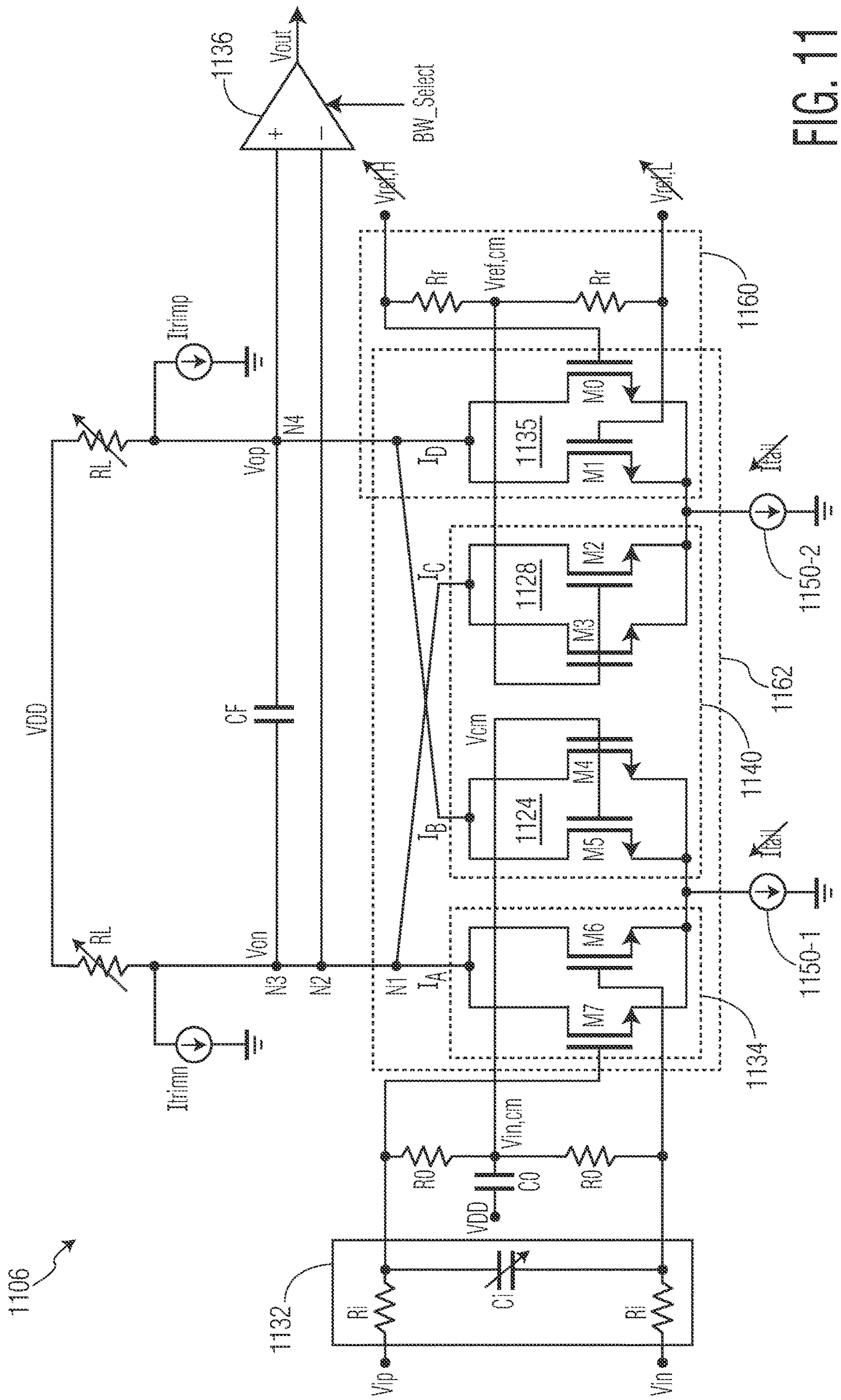
FIG. 11 shows a combined LFPS and LOS detector in accordance with an embodiment of the invention.

FIG. 11 shows a combined LFPS and LOS detector 1106 in accordance with an embodiment of the invention. The combined LFPS and LOS detector 1106 depicted in FIG. 11 is a circuit level implementation of the combined LFPS and LOS detector 906 depicted in FIG. 9. However, the circuit level implementation of the combined LFPS and LOS detector 906 depicted in FIG. 9 is not limited to the combined LFPS and LOS detector 1106 depicted in FIG. 11. In the embodiment depicted in FIG. 11, a differential input signal with voltages Vip, Vin is inputted into the combined LFPS and LOS detector, which can be switched between a "low-current/low-BW" LFPS detection mode and a "high-current/high-BW" LOS detection mode.

In the embodiment depicted in FIG. 11, the combined LFPS and LOS detector 1106 includes a rectifier 1134, a common mode signal generator 1140, a reference level generator 1160, and an operational amplifier which may operate as a comparator 1136. The combined LFPS and LOS detector 1106 also includes two current sources 1150-1, 1150-2 to provide bias current to the rectifier, the common mode generator, and the reference level generator. The combined LFPS and LOS detector may be used to provide LOS detection or LFPS detection for one or more (e.g., high-speed) channels of an interface, which, for example, may be a USB Type-C cable or an interface based on a DP, TBT, or CIO standard. For the sake of convenience, the interface will be referred to as a USB cable. LOS detection or LFPS detection of the combined LFPS and LOS detector can be enabled or disabled to generate an output voltage Vout.

In the embodiment depicted in FIG. 11, the rectifier 1134 is coupled to receive a differential input signal Vip and Vin, which, for example, may correspond to the differential signal lines of a high-speed channel of a USB cable, e.g., USB Type-C. In one embodiment, the rectifier 1134 includes two N-channel metal-oxide semiconductor (NMOS) transistors M6 and M7 connected in parallel between the current source 1150-1 and a node N1. When the transistors M6 and M7 (e.g., the source terminals of the transistors M6 and M7) receive respective signals Vin and Vip of the differential input, currents from the current sources 1150-1, 1150-2 flow through the transistors M6 and M7 and are added at node N1 to form current IA. Thus, the rectifier 1134 effectively transforms a differential input signal (Vip, Vin) varying within a predetermined frequency range into a constant-level output voltage determined based on the summed current $I_A$ and a load resistor RL. In one embodiment, the transistors M6 and M7 may operate in the linear region at this time.

The signals Vin and Vip may be processed in one or more ways before being input into the rectifier 1134. For example, the combined LFPS and LOS detector 1106 may include a low-pass filter (LPF) 1132, which includes two resistors Ri that provides isolation from a high-speed line and a programmable capacitor Ci. Ri are the series input resistors that also provide secondary ESD protection for the transistors M6 and M7 in combination with Ci and gate parasitic capacitors of the transistors M7 and M6. Ci is a programmable capacitor that provides the input BW selection for the incoming signal which will go to the rectifier/amplifier section, which is core of the combined LFPS and LOS detector 1106. The combined LFPS and LOS detector 1106 also includes a capacitor C0 and two resistors R0. $R_0$ and $C_0$ provide the needed common mode voltage for transistors M4 and M5. The voltages corresponding to signals Vin and Vip may be filtered by the LPF 1132.

Because the generated Vin,cm can be constant and because the transistors M4 and M5 operate in the linear region at this time, the common mode voltage Vcm controls the amount of currents passing through transistors M4 and M5, which, in turn, controls the value of current $I_B$, which plays a role in the output of the detector as described in greater detail below.

The node N1 at the output of the rectifier 1134 is coupled to the load resistor RL. The current $I_A$ through the resistor RL is partially used to set the voltage levels at nodes N2 and N3, which, in turn, are used to determine the output of the combined LFPS and LOS detector 1106, e.g., detect low frequency periodic signaling on the channel associated with the differential input line. Itrimn and Itrimp are trim/calibration currents to compensate any process mismatches of all the shown components of the combined LFPS and LOS detector 1106.

As illustrated in FIG. 11, the voltage formed at node N1 sets the voltage input into the inverting terminal (−) of the operational amplifier forming comparator 1136. The voltage at node N1 also helps to form the voltage input into the non-inverting terminal (+). The voltage at node N1 is based on the sum of the current $I_A$ output from the rectifier 1134 and a current $I_C$ that is outputted from a circuit 1128 of the common mode signal generator 1140. The sum of these currents generates the voltage Von, at nodes N2 and N3, based on the value of the resistor RL.

In the embodiment depicted in FIG. 11, the circuit 1128 of the common mode signal generator 1140 includes NMOS transistors M2 and M3 coupled in parallel between node N1 and the current source 1150-2. The transistors M2 and M3 control the value of the current $I_C$ based on a sum of the currents passing through the transistors M2 and M3. The values of the currents passing through the transistors M2 and M3 are based on a common mode reference voltage Vref,cm. The common mode reference voltage Vref,cm may be predetermined and set based on the current from the current source 1150-2 and the values of resistors Rr. Using these resistance values, the voltages Vref, H and Vref,L may be set, which, in turn, sets the common mode reference voltage Vref,cm used to determine the amount of current $I_C$. The value of $I_C$ may be considered a reference current, which may have a constant value for fixed values of Rr. The reference current $I_C$ is added to the current $I_A$ output from the rectifier 1134 (which is proportional to the difference between Vip and Vin of the differential input signal) in order to set the node voltage Von at nodes N2 and N3. In one embodiment, the values of Rr may be set so that the common mode reference voltage Vref,cm corresponds to an average of Vref,H and Vref,L. Also, Vref,H and Vref,L can be programmable to set different detection threshold values based on the intended application of the signal detector. The detection of an LFPS signal may, for example, be input into a controller for powering up or activating the high-speed channel.

In the embodiment depicted in FIG. 11, a circuit 1124 of the common mode generator 1140 includes NMOS transistors M4 and M5 coupled in parallel between node N4 and the current source 1150-1. The transistors M4 and M5 control the value of the current $I_B$ based on a sum of the currents passing through the transistors M4 and M5. The values of the currents are based on the common mode voltage Vcm input into the transistors M4 and M5. Because the common mode voltage Vcm is generated based on a difference between the differential signals of the input signal, current $I_B$ is proportional to the common mode voltage, which makes current $I_B$ a useful component in detecting LFPS signaling.

In the embodiment depicted in FIG. 11, a circuit 135 of the reference level generator 1160 generates a current $I_D$, which is added to current $I_B$ for performing LFPS signaling detection. The circuit 135 includes NMOS transistors M0 and M1 connected in parallel and coupled between node N4 and the current source 1150-2. The transistors M0 and M1 pass currents when voltages Vref, H and Vref,L are respectively coupled to their gates. As previously explained, the values of resistors Rr may be selected to control the values of these currents. Thus, in one embodiment, current $I_D$ may have a fixed value that serves as a reference current that is added to current $I_C$ to form voltage Vop at node N4. In some embodiments, the transistors M0, M1, M2, M3, M4, M5, M6, M7 form a rectification and amplification circuit 1162 for the rectified incoming signal minus Vref (Vref=Vref,H−Vref,L which is proportional to detection threshold).

In the embodiment depicted in FIG. 11, the node N4 is coupled to the resistor RL. The supply voltage VDD may be provided to enable operation of the common mode reference generator 1140 and the reference level generator 1160 based on an enable signal. The comparator 1136 generates a detection signal relative to the differential input line (Vip, Vin) based on the voltage Von at node N2 and the voltage at node N4. The detection signal may have a first value to indicate the presence of a certain type of signaling or signal on the input and may have a second value to indicate the absence of the certain type of signaling or signal. The certain type of signaling may be, for example, LFPS signaling or another type of signal or signaling or condition in a host circuit and/or one or more of its communication channels. In operation, any difference $|Vip-Vin|$ between the components of the differential signal input into the rectifier 1134 translates into differences in the voltages applied to the transistors M6 and M7, and this is so whether the difference is positive or negative, e.g., whether Vip>Vin or Vin>Vip. When a difference $|Vip-Vin|\neq 0$ exists, that difference will cause more current to flow into the transistors M6 and M7. When $|Vip-Vin|$ increases, current $I_A$ increases.

In some embodiments, when the combined LFPS and LOS detector 1106 is enabled (EN) and LFPS signaling exists on the differential input line of the channel, the rectifier 1134 rectifies the differential input signal. When $|Vip-Vin|$ is less than the difference between the reference voltages Vref,H and Vref,L (that is, when $|Vip-Vin|<$ (Vref,H−Vref,L)), then Vop at node N4 is greater than Von at node N3, e.g., Vop>Von. When Vop>Von, then the voltage applied to the non-inverting terminal of the comparator 1136 is negative and thus less than the voltage Von applied to the inverting terminal of the comparator 1136 from node N2. As a result, the signal Vout generated at the output of the comparator has a value indicative of the detection of LFPS signaling on the input line of the channel.

In at least one embodiment, a filter may be coupled between node N3 and node N4 in order to suppress noise. The filter may include a capacitor CF operating as a low-pass filter, in combination with RL resistors, to remove high-frequency components or other spurious signals that might be coupled to the differential input signal or which might otherwise be present, for example, as the result of electromagnetic interference, parasitic coupling from the signal lines of an adjacent channel, and/or other effects.

The operational amplifier forming comparator 1136 may have a low current/high current mode to make it faster or slower, which can be set using a BW-Select control signal to have multiple BW selection to support different standards. Itail and RL, which are programmable, provide the low and high current mode, equally slow or fast, low or high BW portion of the core of the combined LFPS and LOS detector 1106. Lower Itail may need larger RL to keep the needed gain at required level. Also, their value needs to be selected properly to keep the transistors M0 to M7 in the required operational condition. RL and CF can shape another round of filtering for the rectified signal which are compared to Vref, H-Vref,L. Larger RL which is needed for lower Itail, in combination with CF, lowers the BW which means slower rectifier and gain stage. The reference voltages, Vref,H and Vref,L will be a programmable DC reference voltage to provide different squelch detection threshold levels for the incoming signals. This is needed for an industrial chip to support different channel loss of different platforms. Also, low-speed signaling (e.g., LFPS) has different threshold compared to high-speed signaling. Itail and RL are programmable to provide different rectifying behavior, equally faster or slower rectification for high current or low current modes, equally high-speed or low speed modes to keep DC operational point of the core circuit well defined.

Figure 12:
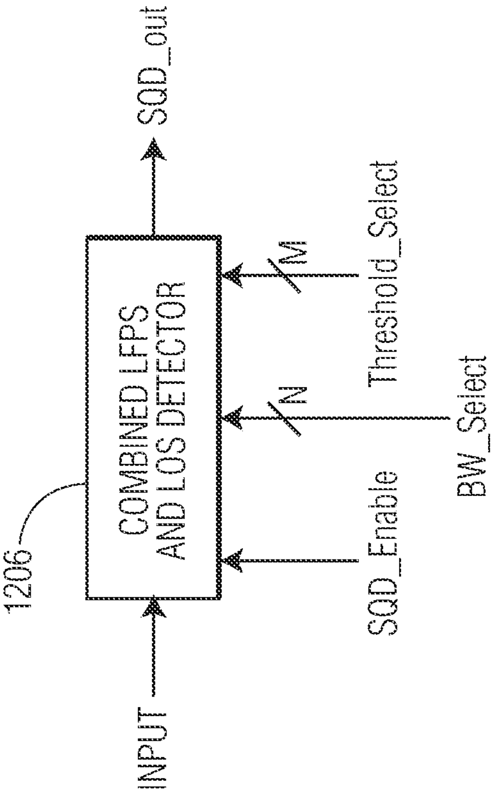
FIG. 12 shows general control signals of a combined LFPS and LOS detector.

FIG. 12 shows general control signals of a combined LFPS and LOS detector 1206, which may be an embodiment of the combined LFPS and LOS detector 1106 depicted in FIG. 11. However, the combined LFPS and LOS detector 1106 depicted in FIG. 11 is not limited to the combined LFPS and LOS detector 1206 depicted in FIG. 12. LOS detection or LFPS detection of the combined LFPS and LOS detector 1206 can be enabled or disabled to generate an output signal SQD_out based on an input. As shown om FIG. 12, an enablement signal SQD_Enable can be used to enable or disable the combined LFPS and LOS detector 1206. A bandwidth selection signal BW_select, which is N bit, can be used to select the needed BW. In only two BW selection case for low-speed and high-speed, equally LFPS or LoS for one standard, N=1. If many standards like different USB or different DP are being supported, more high-speed BW selection is needed which means N>1 and the exact value depends on the number of supported standards. A threshold selection signal Threshold_select, which is M bit(s), can be used to select different detection threshold values. The bandwidth selection signal BW_select can be used to control Ci, RL and Itail in the combined LFPS and LOS detector 1106 depicted in FIG. 11, while threshold selection signal, Threshold_select can control Vref,H and VrefL in the combined LFPS and LOS detector 1106 depicted in FIG. 11.

Figure 13:
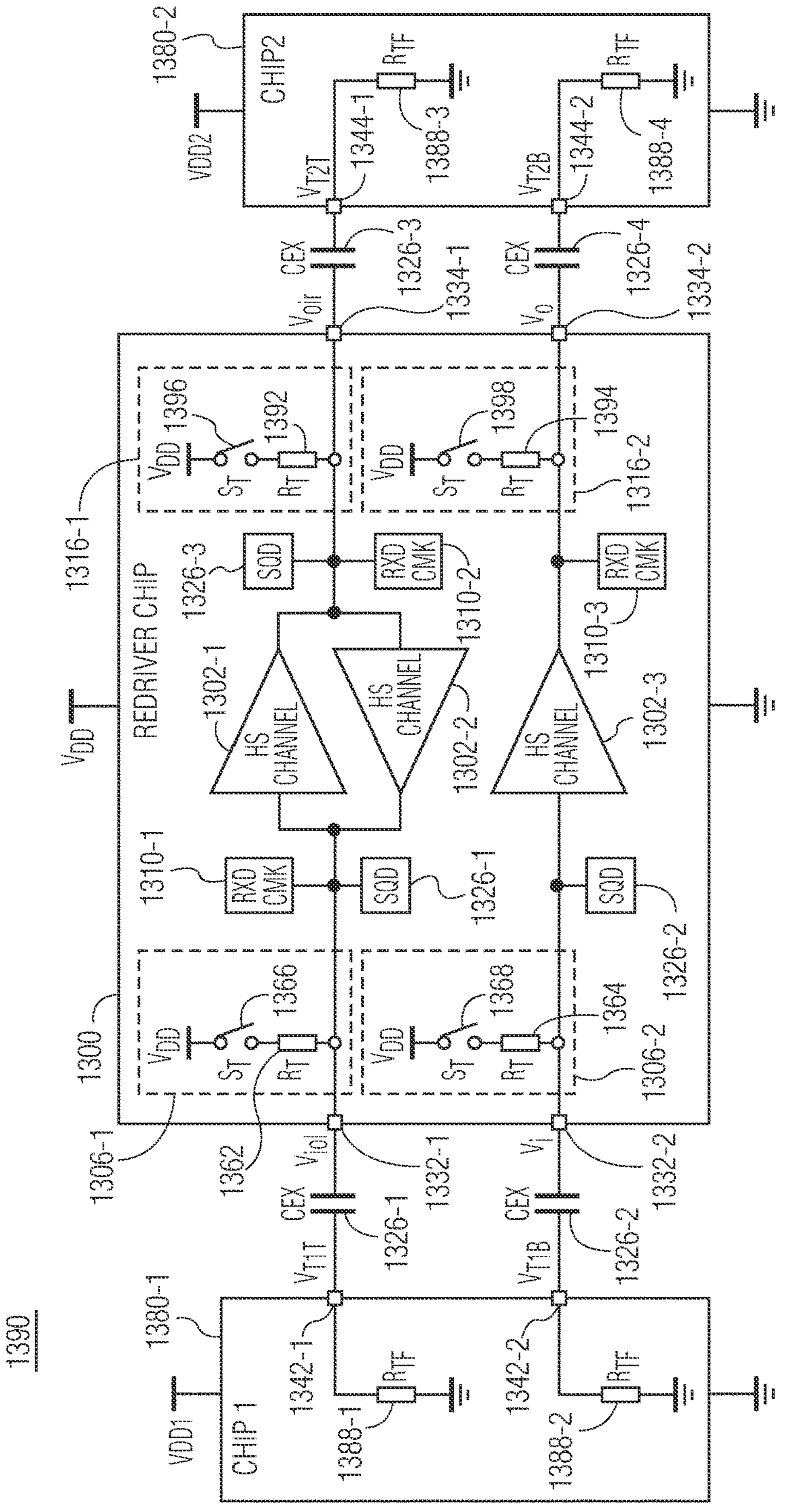
FIG. 13 depicts a redriver in accordance to an embodiment of the invention.

FIG. 13 depicts a redriver 1300 (e.g., a redriver IC chip) in accordance to an embodiment of the invention. In the embodiment depicted in FIG. 13, the redriver 1300 is coupled to a first IC chip 1380-1 through input terminals/pins 1332-1, 1332-2 and is coupled to a second IC chip 1380-2 through output terminals/pins 1334-1, 1334-2. The redriver can be used to provide signal amplification and/or waveform shaping such that a transmitted signal behaves as intended over long channels. For example, the redriver can be used to compensate the insertion loss and/or to address other signal integrity challenge. In the embodiment depicted in FIG. 13, the first IC chip 1380-1, the second IC chip 1380-2, and the redriver 1300 can form a combination redriver system 1390 with bi-directional and uni-directional high-speed repeating functionality. Supply voltages, $V_{DD1}$ and $V_{DD2}$, of the IC chips 1380-1, 1380-2 may be the same or different from supply voltage, $V_{DD}$, of the redriver 1300. The IC chips 1380-1, 1380-2 may exist on the same substrate or different substrates from the redriver 1300. Connections between the redriver and the IC chips 1380-1, 1380-2 may be through printed circuit board (PCB) pins and/or cable connectors. In the embodiment depicted in FIG. 13, the redriver 1300 includes two receiver resistive termination units 1306-1, 1306-2, three RX detect (RXD) (e.g., far end termination detector) Common Mode Keeper (CMK) circuits 1310-1, 1310-2, 1310-3, two transmitter resistive termination units 1316-1, 1316-2, three high-speed (HS) redrivers/repeaters 1302-1, 1302-2, 1302-3, and three signal detectors (SQD) 1326-1, 1326-2, 1326-3 (e.g., loss of signal (LoS) and/or Low Frequency Periodic Signaling (LFPS) detectors). Each of the high-speed redrivers/repeaters 1302-1, 1302-2, 1302-3 may include a Continuous Time Linear Equalizer (CTLE), a transmitter driver, a receiver resistive termination unit, a receiver safe-mode resistive unit, a receiver Common Mode Keeper (CMK) circuit, a transmitter resistive termination unit, a transmitter safe-mode resistive unit, and/or a transmitter CMK circuit. Although the redriver 1300 is depicted in FIG. 13 as a single-ended redriver, in other implementations, the redriver 1300 is implemented as a fully differential redriver. In the embodiment depicted in FIG. 13, the SQDs (squelch detectors) 1326-1, 1326-2, 1326-3 are signal detectors at the input side. In some embodiments, the RXD RX detect (RXD) (e.g., far end termination detector) Common Mode Keeper (CMK) circuits 1310-1, 1310-2, 1310-3 are at the output side of the chip which detect the far end termination, either 50Ω or open which means a large impedance, e.g., 200 kΩ), while keeping the needed common mode voltage of the pins. Resistors RT 1392, 1394, which are shown as terminated to the supply voltage $V_{DD}$, are input and output 50Ω termination, which can be a different value depending on the required standard (e.g., 40Ω or 45Ω) and terminated to ground or a DC voltage depending on the circuit requirement and architecture of repeater. Due to the timing and big-difference in frequencies of low frequency (LF) and high frequency (HF) signals (frequency of LF=20-50 MHz versus frequency of HF=0.27-10 GHz or higher, depending on the supported standards) and tough timing requirements to support low power modes. The signal detectors (SQD) 1326-1, 1326-2, 1326-3 may be embodiments of the combined LFPS and LOS detector 106 depicted in FIG. 1, the LFPS/LOS detector 406 depicted in FIG. 4, the combined LFPS and LOS detector 906 depicted in FIG. 9, the combined LFPS and LOS detector 1106 depicted in FIG. 11, and/or the combined LFPS and LOS detector 1206 depicted in FIG. 12.

In the embodiment depicted in FIG. 13, the receiver resistive termination units 1306-1, 1306-2 are electrically connected to the input terminals 1332-1, 1332-2 of the redriver 1300. Each of the receiver resistive termination units 1306-1, 1306-2 includes a resistor 1362 or 1364 electrically connected to an input terminal 1332-1 or 1332-2 of the redriver, a switch 1366 or 1368 connected to the resistor and to the direct current (DC) supply voltage, $V_{DD}$, of the redriver (depending on the designed circuits and system requirements, they can be connected to ground too). The resistance value of the resistors 1362, 1364 may be around of 50Ω (e.g., within ±30% of 50Ω). Control circuits may include one or more processors, such as digital state machines, microcontrollers or CPUs configured to control the switches 1366, 1368.

In the embodiment depicted in FIG. 13, the transmitter resistive termination units 1316-1, 1316-2 are electrically connected to the output terminals 1334-1, 1334-2 of the redriver 1300. Each of the transmitter resistive termination units 1316-1, 1316-2 includes a resistor 1392 or 1394 electrically connected to an output terminal 1334-1 or 1334-2 of the redriver, a switch 1396 or 1398 connected to the resistor and to the direct current (DC) supply voltage, $V_{DD}$, of the redriver. The resistance value of the resistors 1392, 1394 may be around of 50 ohms (e.g., within ±30% of 50Ω). Control circuits may include one or more processors, such as digital state machines, microcontrollers or CPUs configured to control the switches 1396, 1398.

In the embodiment depicted in FIG. 13, the redriver 1300 is electrically connected to the IC chips 1380-1, 1380-2 via decoupling capacitors 1326-1, 1326-2, 136-3, 1326-4 with a capacitance value, $C_{EX}$, which may be around 100 nF to 300 nF to isolate DC values of the redriver chip 200 from the IC chips 1380-1, 1380-2. During a ramp up or ramp down of the supply voltage of the redriver 1300 (e.g., from 0 to $V_{DD}$ or from $V_{DD}$ to 0), its delta (V) (i.e., the change) of voltages Viol, Vi and Voir, Vo at the input terminals/pins 1332-1, 1332-2 and the output terminals/pins 1334-1, 1334-2 can be large.

Figure 14:
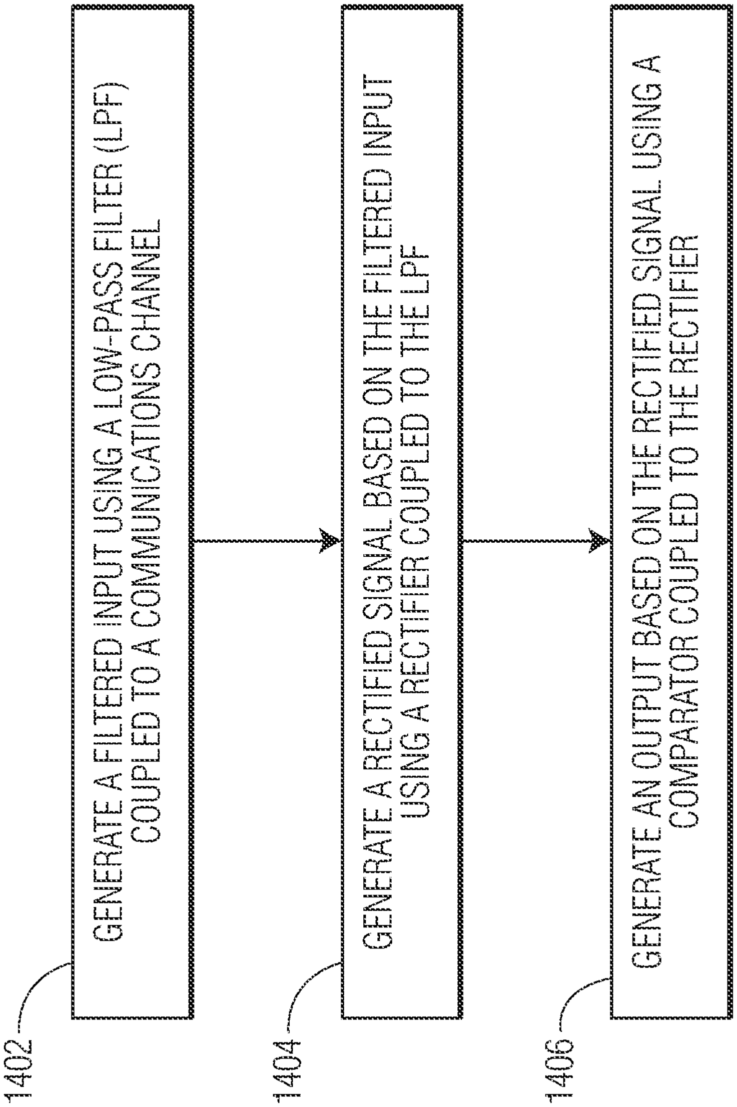
FIG. 14 is a process flow diagram of a method for signal detection in accordance to an embodiment of the invention.

FIG. 14 is a process flow diagram of a method for signal detection in accordance to an embodiment of the invention. According to the method, at block 1402, a filtered input is generated using a low-pass filter (LPF) coupled to a communications channel. At block 1404, a rectified signal is generated based on the filtered input using a rectifier coupled to the LPF. At block 1406, an output is generated based on the rectified signal using a comparator coupled to the rectifier. In some embodiments, the rectified signal is compared with a reference voltage using the comparator to generate the output. In some embodiments, the comparator and the rectifier are enabled by an enablement signal for LFPS detection. In some embodiments, LOS detection detects a first frequency range of data communications through the communications channel, LFPS detection detects a second frequency range of the data communications through the communications channel, and the second frequency range is included in the first frequency range. In some embodiments, LOS detection consumes higher current, and wherein LFPS detection consumes lower current. In some embodiments, the LPF includes a resistor coupled to the communications channel, a programmable capacitor coupled to the resistor, a switch connected between the programmable capacitor and a fixed voltage, and a second capacitor coupled to the programmable capacitor and to the resistor. In some embodiments, the second capacitor is coupled to the programmable capacitor, to the resistor, and to the fixed voltage. In some embodiments, the fixed voltage is zero volt. In some embodiments, LOS detection and LFPS detection are enabled in a high-power operational state. The LPF may be similar to, the same as, or a component of the LPF 932 depicted in FIG. 9. The rectifier may be similar to, the same as, or a component of the rectifier 934 depicted in FIG. 9. The comparator may be similar to, the same as, or a component of the comparator 936 depicted in FIG. 9.

Although some examples are described with reference to USB, the invention is not limited to USB and can be used for any type of signal conditioner that supports protocol based multi standard chips. The invention can be integrated in a low-frequency and high-frequency squelch detector. For example, the invention can also be used for Thunderbolt (TBT) and/or DisplayPort (DP) applications.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device for signal detection comprising:

a low-pass filter (LPF) coupled to a communications channel and configured to generate a filtered input;

a rectifier coupled to the LPF and configured to generate a rectified signal based on the filtered input; and a comparator configured to generate an output based on the rectified signal;

wherein the LPF includes, a programmable capacitor coupled to the communications channel;

a switch connected between the programmable capacitor and a fixed voltage.

2. The device for signal detection of claim 1, wherein the comparator is further configured to compare the rectified signal with a reference voltage to generate the output.

3. The device for signal detection of claim 2, wherein the comparator and the rectifier are configured to be enabled by an enablement signal for a Low Frequency Periodic Signaling (LFPS) detection.

4. The device for signal detection of claim 3, wherein Loss of Signal (LOS) detection detects a first frequency range of data communications through the communications channel, wherein LFPS detection detects a second frequency range of the data communications through the communications channel, and wherein the second frequency range is included in the first frequency range.

5. The device for signal detection of claim 4, wherein LOS detection consumes a first current, and wherein LFPS detection consumes a second current that is lower than the first current.

6. The device for signal detection of claim 1, wherein the LPF comprises:

a resistor coupled to the communications channel and the programmable capacitor;

and a second capacitor coupled to the programmable capacitor and to the resistor.

7. The device for signal detection of claim 6, wherein the second capacitor is coupled to the programmable capacitor, to the resistor, and to the fixed voltage.

8. The device for signal detection of claim 7, wherein the fixed voltage is zero volt.

9. The device for signal detection of claim 1, wherein a Low Frequency Periodic Signaling (LFPS) detection and a Loss of Signal (LOS) detection are enabled when the device for signal detection operates in an operational state that consumes a higher power than another operational state.

10. A communications device, the communications device comprising:

a device for signal detection coupled to a communications channel;

a digital logic circuit configured to process an output of the device for signal detection to generate a processed output and to output the processed output for controlling data communications through the communications channel;

a low-pass filter (LPF) coupled to the communications channel and configured to generate a filtered input;

a rectifier coupled to the LPF and configured to generate a rectified signal based on the filtered input; and a comparator configured to generate the output based on the rectified signal wherein the LPF includes, a programmable capacitor coupled to the communications channel;

a switch connected between the programmable capacitor and a fixed voltage.

11. The communications device of claim 10, wherein the comparator is further configured to compare the rectified signal with a reference voltage to generate the output.

12. The communications device of claim 11, wherein the comparator and the rectifier are configured to be enabled by an enablement signal for Low Frequency Periodic Signaling (LFPS) detection.

13. The communications device of claim 12, wherein Loss of Signal (LOS) detection detects a first frequency range of data communications through the communications channel, wherein LFPS detection detects a second frequency range of the data communications through the communications channel, and wherein the second frequency range is included in the first frequency range.

14. The communications device of claim 10, wherein the LPF comprises:

a resistor coupled to the communications channel and the programmable capacitor;

and a second capacitor coupled to the programmable capacitor and to the resistor.

15. The communications device of claim 14, wherein the second capacitor is coupled to the programmable capacitor, to the resistor, and to the fixed voltage.

16. The communications device of claim 15, wherein the fixed voltage is zero volt.

17. The communications device of claim 10, wherein Low Frequency Periodic Signaling (LFPS) detection and Loss of Signal (LOS) detection of the device for signal detection are enabled when the communications device operates in an operational state that consumes a higher power than another operational state.

18. The communications device of claim 10, wherein the digital logic circuit is configured to perform a plurality of logic operations using the output of the device for signal detection.

19. A method for signal detection, the method comprising:

generating a filtered input using a low-pass filter (LPF) coupled to a communications channel;

generating a rectified signal based on the filtered input using a rectifier coupled to the LPF; and generating an output based on the rectified signal using a comparator coupled to the rectifier;

wherein the LPF includes, a programmable capacitor coupled to the communications channel;

a switch connected between the programmable capacitor and a fixed voltage.

* * * * *